United States Patent [19]

Sugimoto et al.

[11] Patent Number: 4,649,743
[45] Date of Patent: Mar. 17, 1987

[54] ABNORMAL NOISE DETECTOR FOR GEAR UNITS

[75] Inventors: Hiroshi Sugimoto, Toyonaka; Koichi Fukada, Kobe, both of Japan

[73] Assignee: Mitsubishi Denki Kabushiki Kaisha, Tokyo, Japan

[21] Appl. No.: 847,111

[22] Filed: Apr. 3, 1986

Related U.S. Application Data

[63] Continuation of Ser. No. 586,827, Mar. 6, 1984.

[30] Foreign Application Priority Data

Mar. 9, 1983 [JP] Japan .................... 58-40324

[51] Int. Cl.$^4$ ............................ G01M 13/02
[52] U.S. Cl. ........................... 73/162; 73/593
[58] Field of Search ............... 73/162, 593; 33/179.5

[56] References Cited

U.S. PATENT DOCUMENTS

| | | | |
|---|---|---|---|
| 3,127,767 | 4/1964 | Kamp | 73/162 |
| 3,530,712 | 9/1970 | Matteucci | 73/162 |
| 3,712,130 | 1/1973 | Weichbrodt | 73/162 |

FOREIGN PATENT DOCUMENTS 693139 10/1979 U.S.S.R. ....................... 73/162

*Primary Examiner*—Charles Frankfort
*Assistant Examiner*—Denis E. Corr
*Attorney, Agent, or Firm*—Leydig, Voit & Mayer

[57] ABSTRACT

An abnormal noise detector for use in evaluating the quality of automotive gear units or the like is disclosed. The present invention employs a microphone which picks up the noise produced by a gear unit being tested and an adjustable bandpass filter connected to the microphone which passes only those signals from the microphone having a desired frequency, the desired frequency being a function of the rate of rotation of the gear unit. The bandpass filter is controlled by a proportional amplifier responsive to the rate of rotation of the gear unit which at any rate of rotation of the gear unit causes the bandpass filter to pass only the desired frequency. The filtered output from the bandpass filter is applied to an X-Y recorder which automatically plots the sound pressure of the noise having the desired frequency as a function of the rate of rotation of the gear unit or as a function of the desired frequency.

3 Claims, 4 Drawing Figures

ABNORMAL NOISE DETECTOR FOR GEAR UNITS

This application is a continuation of application Ser. No. 586,827, filed Mar. 6, 1984.

BACKGROUND OF THE INVENTION

The present invention relates to an abnormal noise detector, and more particularly to a noise detector for use in determining the quality of gear units for automobiles and the like by detecting abnormal noises produced by the gear units.

In the manufacture of gear units for automobiles, the testing of the noise level of the gear unit is an important step in ascertaining its quality.

A low noise level is generally a sign of excellent mechanical performance. Although a noisy gear unit may in fact have excellent performance, a high noise level is often indicative of a short life span for the gear unit. In order to ensure a high quality gear unit of long life span, it is important to identify those gear units producing a high level of noise.

One of the conventional methods used to evaluate the noise level of a gear unit is to connect the gear unit between a drive motor and a load (for example, a second motor), drive the gear unit at various speeds, and have a trained human tester evaluate the noise level by listening. However, since the results vary depending on the expertise of the tester, his state of health at the time of testing, and other human factors, it has the disadvantage of low reproducibility.

Another conventional method of evaluating the noise level of gear units is to employ an automatic frequency analyzer instead of a human tester. In this method, a microphone placed in the vicinity of a gear unit to be tested is connected to the frequency analyzer. The gear unit is driven at different speeds, and the microphone picks up the noise from the gear unit and provides a corresponding electrical output to the frequency analyzer. The frequency analyzer automatically produces frequency spectra of the noise produced by the gear unit. From the frequency spectra, the frequencies of noise produced by the gear unit and the corresponding sound pressures can be determined. A frequency analyzer has the obvious advantage over a human tester in that its results are highly reproducible. However, the frequency of the noise produced by the gear unit is very dependent on the speed at which the gear unit is driven, and it is therefore necessary to obtain frequency spectra for the entire speed range of the gear unit. The evaluation of the large amount of data thus obtained is so time consuming that a faster determination of the overall noise level can be obtained by relying on the ear of a human tester than by evaluating the data. This method is far too time consuming to be used in testing mass produced gear units, in which speed is important.

SUMMARY OF THE INVENTION

It is the object of the present invention to provide an abnormal noise detector for gear units which can automatically provide meaningful noise level data in a form which can be easily evaluated.

It is another object of the present invention to provide an abnormal noise detector for gear units which has good reproducibility.

As described above, the conventional method of noise evaluation using a frequency analyzer has the drawback that the sound pressures of all noise produced by a gear unit being tested are monitored, resulting in too much data for speedy analysis. In fact, however, at any rate of rotation of a gear unit being tested, only certain desired frequencies of noise need be monitored in order to determine whether the gear unit is producing abnormal noises, and other frequencies may be disregarded. Accordingly, an abnormal noise detector according to the present invention is constructed so as to record in graphic form only the sound pressures of noises having these desired frequencies. In the present invention, all the noises produced by a gear unit being tested are picked up by a microphone, but an adjustable bandpass filter connected to the microphone automatically filters out all components of the output signal from the microphone except that having a desired frequency which depends on the rate of rotation of the gear unit being tested. The sound pressure of the noise having this desired frequency is plotted on an X-Y recorder as a function of the rate of rotation of the gear unit being tested or as a function of the frequency of the noise. The data recorded in graphic form by the X-Y recorder can be easily and quickly evaluated to determine the quality of the gear unit being tested.

An abnormal noise detector for gear units according to the present invention comprises a microphone placed in the vicinity of a gear unit to be tested, speed detecting means for detecting the rate of rotation of the input shaft of the gear unit and producing an output signal corresponding to that rate, proportional amplifying means responsive to the speed detector for producing a control signal the level of which is proportional to the level of the output signal from the speed detecting means, filter means responsive to the control signal from the amplifying means for filtering the output from the microphone and passing only a desired frequency, the value of the frequency depending on the level of the control signal, and recording means for recording the level of the filtered output from said filter means and the level of the output signal from the speed detecting means.

DESCRIPTION OF THE PREFERRED EMBODIMENT

Figure 1:
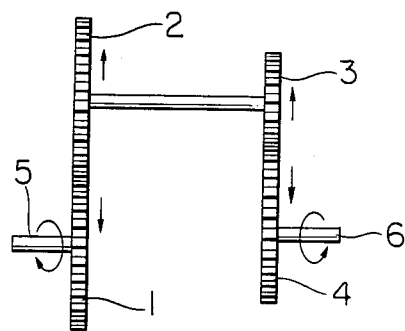
FIG. 1 is a schematic drawing of a gear unit having 4 gears to which the present invention can be applied.

Before describing an embodiment of the present invention, the principles behind its operation will be explained with reference to FIG. 1, which is a schematic drawing of a gear unit with 4 gears to which the abnormal noise detector according to the present invention can be applied. The gear unit comprises a first gear 1 mounted on an input shaft 5, a second gear 2 which meshes with the first gear 1, a third gear 3 mounted on the same shaft as the second gear 2, and a fourth gear 4 which is mounted on an output shaft 6 and which meshes with the third gear 3.

When such a gear unit is driven by a drive motor connected to the input shaft 5, various noises will be produced by the gear unit due to vibration of the gear unit as a whole, vibration of bearings, and other factors, but the greatest source of noise, i.e. the source of noise having the greatest sound pressure is the meshing of the first gear 1 with the second gear 2, and the meshing of the third gear 3 with the fourth gear 4. The frequencies of noise produced by this meshing will be multiples of the rate at which teeth of the gears mesh. The frequency of noise produced by meshing of the first gear 1 and the second gear 2 having the greatest sound pressure is thus a function of the rate of rotation of the first gear unit 1. This frequency will be here referred to as $f_1(N)$ and is equal to $$f_1(N) = a \times N \times K_1 \tag{1}$$

where a is a proportionality constant, N is the rate of rotation of the first gear 1 in revolutions per second, and $K_1$ is the number of teeth of the first gear 1.

Similarly, the frequency of noise produced by the meshing of the third gear 3 and the fourth gear 4 having the greatest sound pressure is a function of the rate of rotation of the third gear 3, but since the third gear 3 rotates at the same rate as the second gear 2, the frequency is also a function of the rate of rotation N of the input shaft 5. This frequency will be called $f_3(N)$ and is equal to $$f_3(N) = a \times N \times (K_1/K_2) \times K_3 \tag{2}$$

where $K_2$ and $K_3$ are the number of teeth in the second gear 2 and the third gear 3, respectively, while a and N are the same as in Equation (1).

Figure 2:
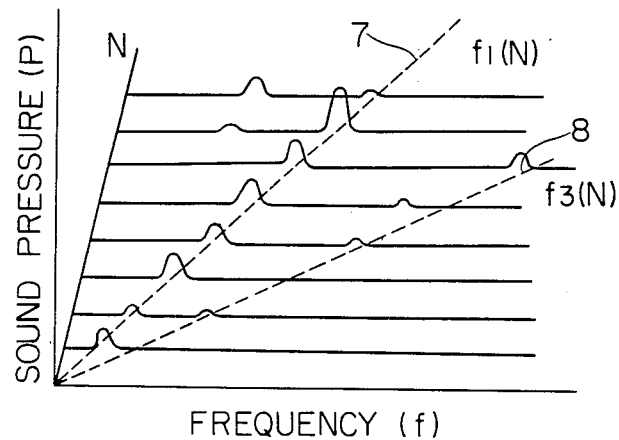
FIG. 2 shows typical frequency spectra of the noise produced by a gear unit such as the one shown in FIG. 1, illustrating the relationship between sound pressure P, the frequency f of the noise produced, and the speed of rotation N of the input shaft of the gear unit.

FIG. 2 shows frequency spectra of the noise produced by a gear unit such as the one shown in FIG. 1 at different rates of rotation N, the spectra obtained using a frequency analyzer. The abscissa represents the frequency of the noise produced and the ordinate represents the corresponding sound pressure. Each roughly horizontal curve is the sound spectrum for a different rate of rotation N. The diagonal line marked 7 is the curve of $f_1(N)$ vs N, and the diagonal line marked 8 is the curve of $f_3(N)$ vs N for the gear unit shown in FIG. 1. For each of the sound spectra, the peaks in the spectrum lie on either line 7 or line 8, and it is therefore clear that at any rate of rotation N, the frequencies of noise producing the maximum sound pressure are clearly $f_1(N)$ and $f_3(N)$. The sound pressure of noises produced at any frequency except $f_1(N)$ and $f_3(N)$ are insignificant by comparison, and an accurate indication of the noise level of a gear unit can be obtained by measuring the sound pressure at $f_1(N)$ and $f_3(N)$, disregarding noises produced at other frequencies.

The present invention takes advantage of this fact and is constructed so as to record the sound pressures of noises produced only at the frequencies f(N) and $f_3(N)$ and to disregard noises produced at other frequencies.

Figure 3:
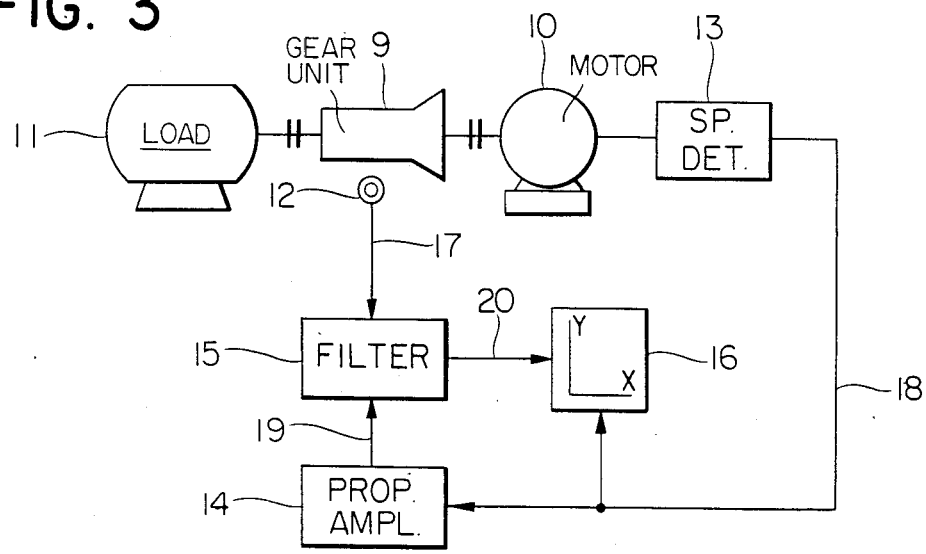
FIG. 3 is a schematic view of an embodiment of an abnormal noise detector for gear units according to the present invention.

A schematic diagram of an embodiment of an abnormal noise detector according to the present invention is shown in FIG. 3 of the attached drawings. In the figure, element number 9 is an automobile gear unit to be tested for noise abnormalities. The gear unit 9 has 4 gears, like the gear unit in FIG. 1, but the number of gears in the unit is not critical. Element number 10 is a drive motor connected to the input shaft of the gear unit 9 for driving the gear unit 9 at different speeds, and element number 11 is a load, such as a second motor, connected to the output shaft of the gear unit 9.

The abnormal noise detector according to the present invention comprises elements number 12 through 16. Element number 12 is a conventional microphone disposed in the vicinity of the gear unit 9 to be tested for picking up the noises produced by the gear unit 9 and producing a corresponding output signal 17, the level of which is proportional to the sound pressure of the noises it picks up. Element number 13 is a conventional speed detector suitably disposed with respect to the drive motor 10 for detecting the rate of rotation N thereof (which is also the rate of rotation of the input shaft of the gear unit 9) and for producing an output signal 18 proportional to the rate N. Element number 14 is a proportional amplifier for receiving the output signal 18 from the speed detector 13 and for producing a control signal 19, the level of which is proportional to the level of the output signal 18. The proportional amplifier 14 should be adjustable so that the ratio of the level of the control signal 19 to the level of the output signal 18 can be set to a desired value. Element number 15 is a conventional adjustable bandpass filter, the pass band of which is controlled by the level of the control signal 19 from the proportional amplifier 14. The bandpass filter 15 receives as an input signal the output signal 17 from the microphone 12 and produces an output signal 20, the frequencies contained therein being only those desired frequencies corresponding to the present rate of rotation. Element number 16 is a conventional X-Y recorder for plotting the sound pressure of the frequency of noise passing through the bandpass filter 15 as a function of rate of rotation N of the input shaft of the gear unit 9. The output signal 18 from the speed detector 13 is provided as an X input and the output signal 20 from the bandpass filter 15 is provided as a Y input, and the X-Y recorder 16 plots values corresponding to the levels of these signals.

The operation of the present embodiment will now be described for the case when it is desired to record the sound pressures of the principal frequencies of noise produced by the meshing of the first and second gears of the gear unit 9, i.e. the sound pressures of noises produced at frequencies f(N). The proportional amplifier 14 is first adjusted so that at any rate of rotation N, the level of the control signal 19 produced by the proportional amplifier 14 in response to the output signal 18 from the speed detector 13 will cause the bandpass filter 15 to pass only that component of the signal 17 from the microphone having a frequency of $f_1(N)$.

The drive motor 10 is then made to drive the gear unit 9 at some constant rate of rotation $n_1$. An output signal 17 will be produced by the microphone 12 containing all the frequencies of noise produced at this rate of rotation, but the adjustable bandpass filter 15 is controlled by the proportional amplifier 14 based on the value of the output signal 18 from the speed detector 13 so as to pass only that noise at the desired frequency $f_1(n_1)$. The output signal 20 from the bandpass filter 15 is then applied to the X-Y recorder 16 as a Y input. At the same time, the output signal 18 from the speed detector 13 is supplied to the X-Y recorder 16 as an X input, and the X-Y recorder plots a single point, the X coordinate of which is proportional to the rate of rotation $n_1$ of the input shaft of the gear unit 9 and the Y coordinate of which is proportional to the sound pressure of the noise having a frequency $f_1(n_1)$ produced by the gear unit 9.

The speed of rotation of the drive motor 10 is then changed to a different value, $n_2$, and the above process is repeated. The X-Y recorder will plot a new point, the X and Y coordinates of which are proportional to the new rate of rotation $n_2$ of the input shaft of the gear unit 9 and the sound pressure of the noise produced at this rate of rotation having a frequency $f_1(n_2)$, respectively.

Figure 4:
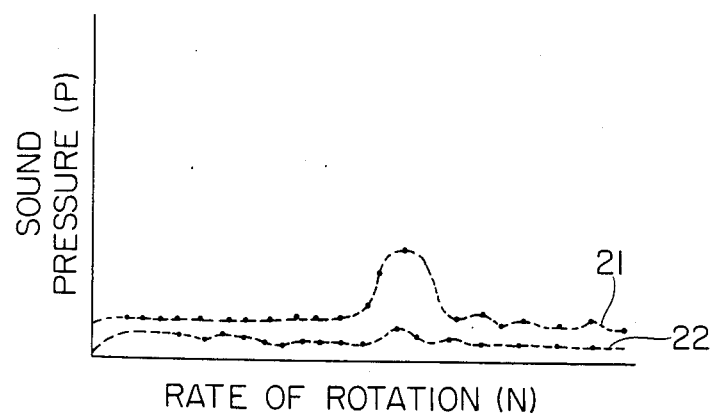
FIG. 4 is a graph of sound pressure P produced by a gear unit such as the one shown in FIG. 1 plotted as a function of the rate of rotation N of the input shaft of the gear unit.

By repeating this process for the entire speed range of the gear unit 9, a curve like the one indicated by reference numeral 21 in FIG. 4 is automatically produced by the X-Y recorder 16. Sound pressure data in this form can be easily evaluated to determine whether the gear unit 9 is producing abnormal noises.

If it is desired to measure the sound pressures of the noise produced by the meshing of the third and fourth gears of the gear unit 9, i.e. the noises produced at frequencies $f_3(N)$, it is merely necessary to adjust the proportional amplifier 14 so that at any rate of rotation N of the input shaft of the gear unit 9, the control signal 19 from the proportional amplifier 14 will cause the band-pass filter 19 to pass only noises having a frequency of $f_3(N)$. By repeating the procedures described above for use in measuring the noise produced by the first and second gears of the gear unit 9, a curve of sound pressure vs rate of rotation for the noise produced by the meshing of the third and fourth gears of the gear unit 9 can be obtained. An example of such a curve is indicated in FIG. 4 by reference numeral 22.

In FIG. 4, the abscissa of the graph is the rate of rotation N of the input shaft of the gear unit 9. However, since the frequencies being measured, $f_1(N)$ and $f_3(N)$, are linearly proportional to the rate of rotation N, a curve of sound pressure vs frequency with frequency as the abscissa can be easily obtained from the curve in FIG. 4 merely by changing the scale of the X axis.

Since an abnormal noise detector according to the present invention does not rely on a human tester, it provides highly reproducible results. Furthermore, since the present invention records only that noise level data essential for analysis, the amount of data to be analyzed is much less than that recorded in the conventional method using a frequency analyzer, and accordingly analysis can be carried out much more speedily and easily, making the present invention suitable for use in the mass production of gear units.

Although the above embodiment was described for use in testing a gear unit comprising 4 gears, there is no particular limit on the number of gears. The present invention can be used to test any gear unit having 2 or more gears. Furthermore, although the embodiment shown in FIG. 3 is used to test an automobile gear unit during manufacture, the present invention may be used to test the noise levels of an in-service gear unit to determine its state of degradation, as indicated by its noise levels. In addition, the present invention is not limited to use in testing automobile gear units but may be effectively used in the testing of gear units of other types.

What is claimed is:

1. An abnormal noise detector for gear units having two or more gears and an input shaft comprising:

a motor means driving the input shaft of a gear unit to be tested at incrementally different constant rates of rotation throughout a continuously variable speed range within at least the speed range of the gear unit;

a microphone located in the vicinity of the gear unit and producing an output according to the noise produced by the gear unit;

speed detecting means for detecting the different constant rates of rotation of the input shaft of the gear unit and for producing an output signal corresponding to each of the different constant rates;

proportional amplifying means responsive to said speed detecting means for producing a control signal at each of the different constant rates of rotation having a level which is a function of the rate of rotation and the number of gear teeth on a given gear in the gear unit;

adjustable filter means responsive to said control signal from said proportional amplifying means for filtering the output from said microphone and for passing only that band of the output from said microphone containing selected frequencies corresponding to the level of said control signal and in accordance with said function of the rate of rotation; and plotting means for recording the level of the filtered output at the selected frequencies from said filter means as a function of the level of the corresponding output signal from said speed detecting means representing the rate of rotation of the input shaft at the different constant rates of rotation of the input shaft. to determine facts about quality of said gear unit from said plotting by an abnormal noise level within any band of selected frequencies.

2. An abnormal noise detector for gear units as claimed in claim 1, wherein said selected frequency band is one of the frequencies of the noise produced by the meshing of two of the gears in said gear unit.

3. An abnormal noise detector for gear units as claimed in claim 2 wherein said recording means is an X-Y recorder which plots the level of said filtered output from said filter means as a function of the level of said output signal from said speed detecting means.

* * * * *